(12) United States Patent
Altmann et al.

(10) Patent No.: US 11,160,364 B2
(45) Date of Patent: Nov. 2, 2021

(54) FILAMENT TRANSPORTATION DEVICE

(71) Applicant: The Procter & Gamble Company, Cincinnati, OH (US)

(72) Inventors: Niclas Altmann, Niddatal (DE); Andreas Birk, Kronberg (DE); Christian Gehret, Rieneck (DE); Volker Rudolph, Unterwittbach (DE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 16/891,695

(22) Filed: Jun. 3, 2020

(65) Prior Publication Data

US 2020/0383469 A1 Dec. 10, 2020

(30) Foreign Application Priority Data

Jun. 7, 2019 (EP) ..................................... 19179137
Apr. 20, 2020 (EP) ..................................... 20170284

(51) Int. Cl.
*B65G 51/18* (2006.01)
*A46D 3/08* (2006.01)
(Continued)

(52) U.S. Cl.
CPC .............. *A46D 3/082* (2013.01); *B65G 53/06* (2013.01); *B65G 53/60* (2013.01); *A46B 9/04* (2013.01); *A46B 2200/1066* (2013.01)

(58) Field of Classification Search
CPC ........ B65G 51/18; B65G 51/20; B65G 11/00; B65G 47/44; B65G 2205/04;
(Continued)

(56) References Cited

U.S. PATENT DOCUMENTS 3,628,649 A * 12/1971 Arvisenet ............... B65B 35/54
198/444
4,342,404 A * 8/1982 Baker .................... B65G 11/20
221/10
(Continued)

FOREIGN PATENT DOCUMENTS

DE 102010055686 A1 6/2012
WO WO201981073 5/2019

OTHER PUBLICATIONS

Extended European Search Report and Search Opinion; Application Ser. No. 19179137.5; dated Nov. 4, 2019; 10 pages.
(Continued)

*Primary Examiner* — Joseph A Dillon, Jr.
(74) *Attorney, Agent, or Firm* — Vladimir Vitenberg

(57) ABSTRACT

A filament-transportation device has a plurality of tube elements for transporting filaments from an intake area to an outtake area via an airstream generated by underpressure or overpressure. Each tube element has an end orifice. A baffle-plate unit has a baffle plate having a through-hole, a top surface opposite to the end orifices to stop the transport of the filaments, and a bottom surface opposite to the top surface. The baffle plate includes baffle plate elements associated with the end orifices. Each of the baffle-plate elements has a top surface forming part of the top surface of the baffle plate, a bottom surface forming part of the bottom surface of the baffle plate, and a side surface extending between the top and bottom surface. There is a plurality of bridge elements, each having a top surface forming part of the top surface of the baffle plate, a bottom surface forming part of the bottom surface of the baffle plate, and a side surface extending from the top surface of the bridge element to the bottom surface of the bridge element. The through-hole is defined either by the side surfaces of at least two baffle plate elements or by the side surfaces of at least one
(Continued)

baffle plate element and of a side surface of at least one bridge element not facing an end orifice of a tube element, which bridge element connects two spaced apart baffle plate elements from the plurality of baffle plate elements.

13 Claims, 6 Drawing Sheets

(51) Int. Cl.
*B65G 53/06* (2006.01)
*B65G 53/60* (2006.01)
*A46B 9/04* (2006.01)

(58) Field of Classification Search
CPC ............ B65G 2205/06; B65G 2812/12; B65G 2812/08; B65G 2812/081; B65G 2812/082; B65G 2812/083; B65G 2812/085; B65G 2812/086; B65G 2812/087; B65G 2812/088; B23P 19/005; A46D 3/04; A46D 3/005
USPC ......... 406/83, 118, 119, 120, 151, 152, 170, 406/192; 198/530, 531, 532, 536, 539; 193/25 FT; 209/911, 924
See application file for complete search history.

(56) References Cited

U.S. PATENT DOCUMENTS

| | | | |
|---|---|---|---|
| 5,033,797 A | 7/1991 | Rueb | |
| 5,683,145 A * | 11/1997 | Boucherie | A46D 9/02 300/2 |
| 5,743,067 A * | 4/1998 | Trimani | A24C 5/354 131/282 |
| 6,120,216 A * | 9/2000 | Teoh | H05K 13/043 406/1 |
| 6,296,473 B1 * | 10/2001 | Ohlmann | B29C 45/7207 425/547 |
| 6,318,540 B1 * | 11/2001 | Spatafora | B65B 19/04 198/347.1 |
| 6,468,005 B1 * | 10/2002 | Esper | B65G 51/02 406/147 |
| 6,575,347 B2 * | 6/2003 | Coonrod | B21J 15/32 227/112 |
| 7,226,248 B2 * | 6/2007 | Hafner | B65G 53/4616 222/636 |
| 7,278,811 B1 * | 10/2007 | Yielding | B63B 25/04 414/137.1 |
| 7,921,499 B2 * | 4/2011 | Huber | B29C 45/16 15/167.1 |
| 8,776,991 B2 * | 7/2014 | Alexander | B65G 47/5122 198/562 |
| 8,814,275 B2 * | 8/2014 | Rees | A46D 3/04 300/5 |
| 9,352,914 B2 * | 5/2016 | Le | B65G 51/32 |
| 9,986,816 B2 * | 6/2018 | Kumpf | A46D 1/08 |
| 10,183,366 B2 * | 1/2019 | Sarramoune | B23P 19/005 |
| 10,221,026 B2 | 3/2019 | Eimann | |
| 10,631,454 B2 * | 4/2020 | Meyer | A01C 23/007 |
| 10,722,024 B2 * | 7/2020 | Mroseck | A46D 3/04 |
| 10,822,183 B2 * | 11/2020 | Roberge | A01C 7/127 |
| 10,926,965 B2 * | 2/2021 | Kelly | B65G 53/50 |
| 2001/0047806 A1 * | 12/2001 | Spatafora | B65B 19/10 131/282 |
| 2008/0012420 A1 * | 1/2008 | Boucherie | A46B 3/06 300/4 |
| 2012/0013169 A1 | 1/2012 | Rees | |
| 2012/0074339 A1 * | 3/2012 | Ikeda | F16K 41/10 251/12 |
| 2015/0266685 A1 | 9/2015 | Eimann | |

OTHER PUBLICATIONS

Extended European Search Report and Search Opinion; Application Ser. No. 20170284.2; dated Oct. 2, 2020; 11 pages.
International Search Report and Written Opinion; Application Ser. No. PCT/US2020/070108; dated Oct. 5, 2020; 16 pages.

* cited by examiner

FILAMENT TRANSPORTATION DEVICE

FIELD OF THE INVENTION

The present disclosure is concerned with a filament transportation device where filaments are transported through tube elements by means of an air stream and where at the end of the tube elements a baffle plate unit is provided to stop the filaments. The present disclosure is also concerned with a brush making machine or a cell of a brush making line comprising such a filament transportation device and with a baffle plate unit for use in such a filament transportation device.

BACKGROUND OF THE INVENTION

It is generally known that bristle filaments for the manufacture of a brush, in particular a toothbrush, can be transported by means of an air stream through at least partly flexible tube elements. At the end of the tube elements, the filaments typically accumulate in tuft holes of a tuft hole plate. In order to inhibit that the filaments are carried out of the tuft holes of the tuft hole plate by the airstream, a baffle plate is arranged below the outlet side of the tuft holes at a relatively short distance. By this means, the air can stream around the baffle plate, but the filaments are retained in the tuft holes. Such a technology is, e.g., generally described in document DE 10 2010 055 686 A1.

It is further known to provide small through-holes into the baffle plate, allowing the air to flow through these through-holes, so that the air stream around the baffle plate is at least reduced and the force acting on the filaments to carry them along with the air stream around the baffle plate and out of the tuft holes is reduced as well. The through-holes may be conically shaped vents having a diameter at the filament abutting side of the baffle plate that is lower than the diameter of the filaments to avoid that the filaments are sucked through the holes. Such a technology is generally described in document WO 2015/142415 A2.

It is described in document U.S. Pat. No. 5,033,797 A1 to pneumatically transfer bristles to positions of alignment with the sockets of one or more form. The individual bristles and/or batches of bristles are thereupon drawn into the aligned sockets by suction prior to being welded or glued to an adapter which constitutes or forms part of a brush body and defines the open ends of sockets during drawing of bristles into the form or forms. Each form has an air evacuation portion in the form of a nipple, which is connected to a suction generating device serving to evacuate air from a suction chamber in a main section of the form. The main section of the form contains a foraminous insert one side of which is adjacent the suction chamber and another side of which is formed with relatively shallow recesses constituting the deepmost portions of blind holes or bores in the main section of the form. Thus, the insert defines the bottom surfaces in the sockets, and the profiles of such bottom surfaces determine the axial position of bristles in the respective tufts. The foraminous insert can be made of a sintered metallic or ceramic material which exhibits a required porosity to permit predictable evacuation of air from the sockets. The insert can also be made of a textile material (e.g., felt) or any other material which exhibits satisfactory permeability. The insert can be replaced with a simple filter or screen having interstices which are sufficiently large to permit rapid evacuation of air from the sockets but still enable the filter or screen to invariably intercept the bristles in desired axial positions in which the tips of the tufts in the sockets exhibit a desired configuration.

As the through-holes or the pores in a foraminous insert or the interstices in a filter are relatively small, they may get clogged over time by small particles, e.g. abraded parts from the filaments or dust. Thus, it is a general object to improve a filament transportation device as described, in particular with respect to the maintenance periods.

SUMMARY OF THE INVENTION

In accordance with at least one aspect, a filament transportation device is provided that comprises a plurality of tube elements for transporting filaments from an intake area to an outtake area via an airstream generated by at least one of an underpressure or overpressure, each tube element having an end orifice, a baffle plate unit comprising a baffle plate having a top surface arranged opposite to the end orifices of the plurality of tube elements to stop the transport of the filaments and a bottom surface arranged opposite the top surface, wherein the baffle plate comprises a plurality of baffle plate elements that are each associated with one of the end orifices and each of the baffle plate elements is arranged opposite to the respective associated end orifice such that filaments transported through the respective tube element will be stopped by the associated baffle plate element, wherein each of the baffle plate elements has a top surface forming part of the top surface of the baffle plate and a bottom surface forming part of the bottom surface of the baffle plate and a side surface extending between the top surface and the bottom surface of the baffle plate element; and wherein at least one through-hole is provided in the baffle plate, where the through-hole is either solely defined by the side surfaces of at least two baffle plate elements or solely defined by the side surfaces of at least one baffle plate element and of a side surface of at least one bridge element not facing an end orifice of a tube element, which bridge element connects two spaced apart baffle plate elements from the plurality of baffle plate elements, where the bridge element has a top surface forming part of the top surface of the baffle plate and a bottom surface forming part of the bottom surface of the baffle plate and the side surface of the bridge element extends from the top surface of the bridge element to the bottom surface of the bridge element.

In accordance with at least one aspect, a brush manufacturing machine or a cell of a brush manufacturing line is provided that comprises a filament transportation device as proposed herein.

In accordance with at least one aspect, a baffle plate unit for use in a filament transportation device is provided that comprises a baffle plate and a mounting frame, wherein the baffle plate has a top surface intended for facing end-orifices of a plurality of tube elements for transporting filaments from an intake area to an outtake area via an airstream generated by at least one of an underpressure or overpressure, a bottom surface opposite the top surface, wherein further the baffle plate comprises a plurality of baffle plate elements, each of the baffle plate elements having a top surface forming a part of the top surface of the baffle plate and a bottom surface forming a part of the bottom surface of the baffle plate and a side surface extending from the top surface of the baffle plate element to the bottom surface of the baffle plate element, wherein the baffle plate further comprises at least one through hole extending from a top surface to a bottom surface of the baffle plate, where the through hole is either solely defined by the side surfaces of at least two baffle plate elements or solely defined by the side surface of at least one baffle plate element and of a side surface of at least one bridge element that connects two spaced apart baffle plate elements, where the bridge element has a top surface forming part of the top surface of the baffle plate and a bottom surface forming part of the bottom surface of the baffle plate and the side surface of the bridge element extends from the top surface of the bridge element to the bottom surface of the bridge element, in particular wherein a top surface area of the through hole is at least 0.05 mm$^2$.

BRIEF DESCRIPTION OF THE DRAWINGS

The present disclosure is further elucidated by a detailed description of example embodiments and with reference to figures. In the figures

DETAILED DESCRIPTION OF THE INVENTION

Figure 1:
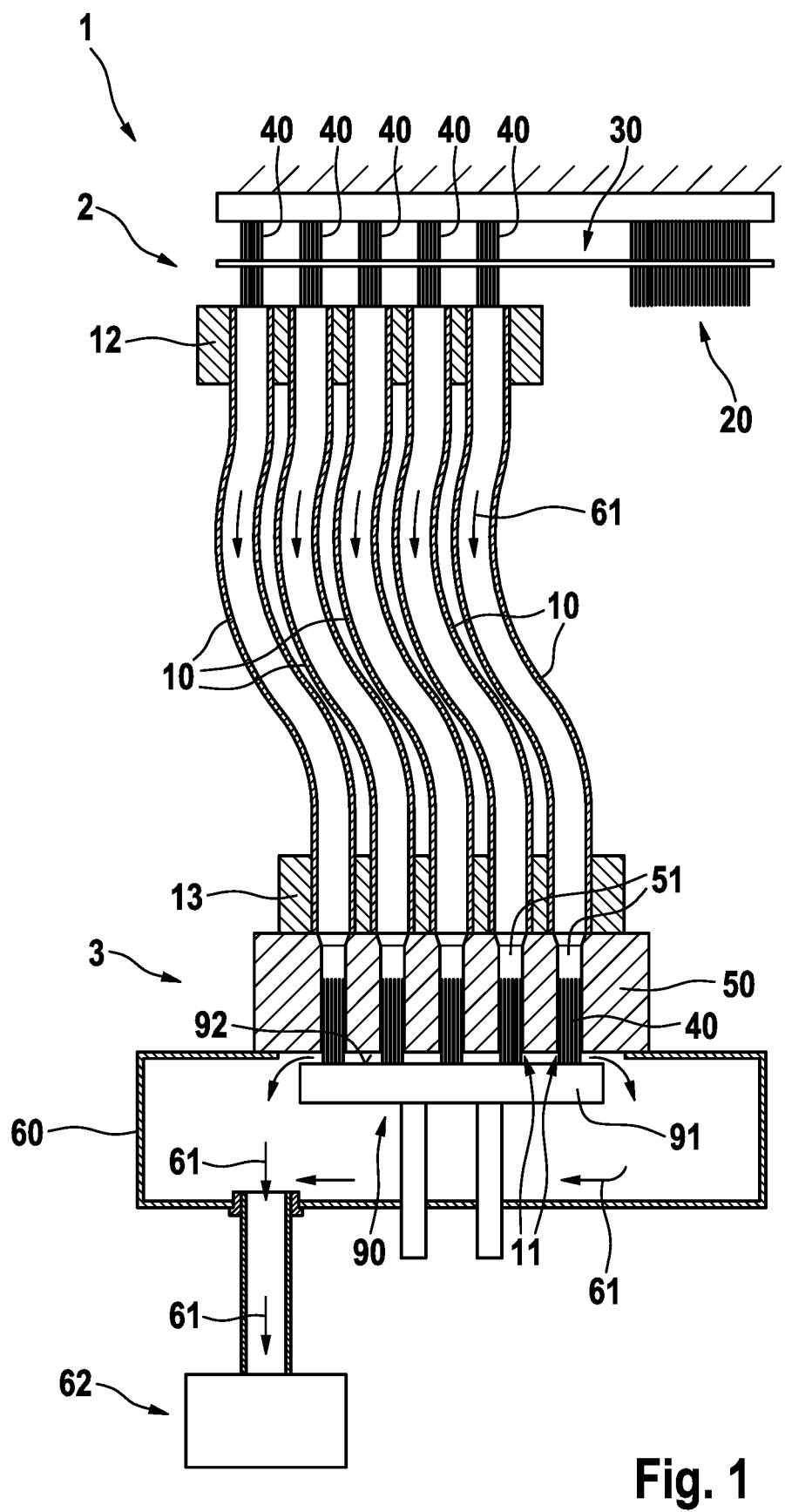
FIG. 1 is a schematic depiction of an example filament transportation device.

The present description is concerned with a filament transportation device, where typically a plurality of filament bundles is simultaneously transported from an intake area to an outtake area by means of an air stream generated by at least one of an underpressure or an overpressure through a plurality of tube elements. The tube elements may be at least partly flexible along their extension length, e.g. the tube elements may each comprise an inflexible inlet tube element, an inflexible outlet tube element and a flexible tube element (e.g. a hose) extending between the inlet and the outlet. The tube elements may comprise flexible tube elements that extend into a filament collection plate having filament collection holes that end with end orifices that are arranged in a certain pattern and a baffle plate may be arranged opposite to the end orifices to stop the filaments that otherwise would be carried away by the airstream. Such a basically known filament transportation device is described further below with reference to FIG. 1.

While it shall not be excluded that the filaments described herein are made from natural hair such as badger hair, filaments may be made from a thermoplastic material such as polyamide (e.g. PA 6.12, also known as nylon) or polybutylene terephthalate (PBT) or any other suitable thermoplastic material. DuPont, Wilmington, USA, is a well-known manufacturer of various filament types typically used for making brushes.

In a non-limiting example, filaments that are transported by the filament transportation device may have a cross sectional size and shape perpendicular to their length extension that fits into a smallest enveloping circle having a diameter in the range of between 75 μm to 250 μm (i.e. filament having a diameter in the range of between about 3 mil to about 10 mil). The length of a filament may be in the range of between 5 mm and 25 mm.

A filament transportation device as described may be a part of a brush making machine. In such a brush making machine, the filaments that were transported into the mentioned filament collection plate and that form bundles of filaments are then further manipulated, in particular the filament bundles may be pushed from the filament collection plate into a first filament bundle plate in which the filament bundles may be compressed, may be forced into a different shape or may be combined to form larger size bundles. Such manipulation processes may be repeated until the filament bundles are in a final filament bundle plate. Then the ends of the filament bundles may be heated so that the filaments of a bundle melt and form a blob of molten material. One may refer to one such connected filament bundle as a filament tuft. These filament tufts may then be overmolded in a molding cavity to form a brush carrier of the tuft arrangement. The brush carrier may itself be formed for being held in a user's hand or may be connected with a brush handle so that a brush is formed. Other and/or additional steps may be performed by a brush making machine comprising a filament transportation device as described. A brush manufacturing line may comprise several brush manufacturing cells that are coupled with each other. One such brush manufacturing cell may comprise the filament transportation device.

The filament transportation device comprises a baffle plate unit, which may be realized as a replaceable part that can be replaced when it is worn out. Thus, a baffle plate unit is a commercially independent object that interacts with the rest of the filament transportation device.

A baffle plate unit for use in a filament transportation device as described comprises a baffle plate having a plurality of baffle plate elements and at least one through-hole provided in a central area of the baffle plate as will be explained in more detail. The baffle plate unit also may comprise a mounting frame and the baffle plate may be connected with the mounting frame by means of at least one bridge element. Additionally or alternatively, the baffle plate may be integral with the mounting frame. Additionally or alternatively, the baffle plate unit may comprise at least one supporting bar that is connected with the mounting frame and with the baffle plate.

The baffle plate unit comprises a baffle plate having a plurality of baffle plate elements that may form at least one group of baffle plate elements and the baffle plate may comprise at least one bridge element connecting two spaced apart baffle plate elements from the plurality of baffle plate elements. The baffle plate unit further comprises a mounting frame for holding the baffle plate and for allowing to mount the baffle plate unit in the filament transportation device. The baffle plate has a top surface and a bottom surface. The top surface is intended for facing end orifices of tube elements for transporting filaments as was explained. The bottom surface is the surface opposite to the top surface.

Each baffle plate element has a top surface intended for stopping filaments—where the top surfaces of each of the baffle plate elements form part of the top surface of the baffle plate, a bottom surface opposite the top surface—where the bottom surfaces of the baffle plate elements form part of the bottom surface of the baffle plate, and a side surface that extends between the top surface and the bottom surface and which side surface may thus extend in a direction essentially perpendicular to the top surface and bottom surface. The latter shall not exclude that the top surface of a baffle plate element is not extending in a plane (i.e. is not planar), but where the top surface has a depression, is concave or has at least a concave portion. Additionally or alternatively, the bottom surface of a baffle plate element may be non-planar, e.g. the bottom surface may have a convex shape, so that an air stream flowing from the top surface towards the bottom surface along the side surface is guided by the bottom surface to support a more laminar flow of the air stream.

Two or more of the plurality of baffle plate elements may form a merged group of baffle plate elements, which means that the side surfaces of the individual baffle plate elements do not encircle around each of the individual baffle plate elements of the merged groups but the side surfaces of the two or more merged baffle plate elements abut on each other at two or more contact edges, where the contact edges extend from the top surface to the bottom surface. As one example, two baffle plate elements that form a merged group of baffle plate elements may be considered as two overlapping baffle plate elements where the top surfaces merge which each other and the bottom surface merge which each other and the side surfaces abut on each other at two contact edges. As a result, the top surfaces and bottom surfaces of the baffle plate elements overlap (or in other words, the merged baffle plate elements share top surface and bottom surface areas).

The baffle plate may comprise at least one bridge element, which bridge element has a top surface that forms part of the top surface of the baffle plate, a bottom surface that forms part of the bottom surface of the baffle plate and a side surface that extends between the top surface and the bottom surface. A bridge element is not intended for stopping filaments. At least two types of bridge elements can be defined:

1. A first type of bridge elements connects two spaced-apart baffle plate elements. When seen in a direction towards the top surface of the baffle plate, an elliptic envelope around a baffle plate element has a long axis extension and a short axis extension in a top surface plane, where the top surface plane may be considered as the plane that locally best approximates to top surface of the baffle plate. The bridge element extending between the two baffle plate elements has a width in a direction in the top surface plane perpendicular to the connection direction that is smaller than the smallest extension of the elliptic envelopes around the two connected baffle plate elements.
2. A second type of bridge elements connects a baffle plate element and the mounting frame of the baffle plate unit. This bridge element has a width in a direction in the top surface plane perpendicular to the connection direction that is smaller than the smallest extension of the elliptic envelope around the baffle plate element that is connected to the mounting frame.

The baffle plate has at least one through hole that extends from the top surface of the baffle plate to the bottom surface. At least three types of through holes can be defined:

1. A first type of through hole is defined by side surfaces of at least two baffle plate elements that form a merged group of baffle plate elements. Such a through hole is considered a through hole in a center area of the baffle plate as it extends in between baffle plate elements.
2. A second type of through hole is defined by the side surfaces of at least one baffle plate element and of at least one bridge element of the first type discussed above. Such a through hole is considered a through hole in a center area of the baffle plate.
3. A third type of through hole is defined at least in part by a side surface of a portion of the mounting frame and further by the side surface(s) of at least one bridge element and/or at least one baffle plate element. Such a through hole is considered a through hole in an out-of-center area of the baffle plate. Such through holes will be discussed in connection with FIGS. 2 and 3.

The through holes discussed herein have a relatively large area in the top surface of the baffle plate, i.e. an area that is larger than the cross-sectional area of the filaments that shall be stopped and thus will not easily be clogged by abraded plastic parts or other dust particles. The filaments may be of a circular cross-sectional shape and may have a diameter of between 75 µm and 500 µm, even though these values shall not be considered as limiting. That means that the through hole has an area in the top surface plane of at least about 0.0044 mm$^2$ for use with 75 µm filaments. For a 250 µm filament, the through hole has an area in the top surface plane of at least about 0.05 mm$^2$. A baffle plate may thus have a through hole having an area of at least 0.05 mm$^2$ in the top surface plane.

The main function of the through hole is to allow airflow around baffle plate elements that is not possible for known designs where either a mesh or porous insert is used and where also the areas around the filament receiving elements may be covered with a non-porous cover. Where a known design of a baffle plate may have fine channels or pores that have a top surface area typically much smaller than the cross-sectional area of the filaments, these tiny holes do not allow for a decent airflow without friction and thus cause turbulences and thus require a high power suction unit. An top surface area of the through hole in the top surface plane larger than the value of 0.0044 mm$^2$ is thus considered as well, e.g. area of the through hole may be at least 0.0075 mm$^2$ or at least 0.01 mm$^2$ or at least 0.025 mm$^2$ or at least 0.05 mm$^2$ or at least 0.1 mm$^2$ or at least 0.25 mm$^2$ or at least 0.5 mm$^2$ or at least 1.0 mm$^2$ or at least 2.5 mm$^2$ or at least 5.0 mm$^2$.

Depending on the design of the baffle plate, the top surface plane of the baffle plate may not be the best choice to determine the area of the through hole. Thus, the following general definition can be used.

The area of the through hole is the maximum area determined by a parallel projection of the border of the through hole as seen in a top view onto the baffle plate with varying view direction, where the parallel projection is to be executed along the view direction onto a projection plane perpendicular to the view direction. The border of the through hole is then defined by the visible edges of the baffle plate elements and/or bridge elements that envelope the through hole (the visible edges may relate to the side surfaces of the baffle plate elements and/or bridge elements). Lines in view direction touching the border of the through hole create the parallel projection on the projection plane. The air flow can use this maximum area.

A baffle plate may comprise at least a first group of baffle plate elements, where the number of baffle plate elements is at least three, at least four, at least 5, at least six, at least seven, at least eight, at least nine, at least ten, at least eleven, at least twelve, at least 15, at least twenty, at least 25, at least 30, at least 35, at least 40, at least 45 or at least 50. The number of through holes, in particular the number of through holes in a center area may be chosen to be at least two, at least three, at least four, at least five, at least six, at least seven, at least eight, at least nine, at least ten, at least eleven, at least twelve, at least 15, at least 20, at least 25, at least 30, at least 35, at least 40, at least 45 or at least 50. The top surface plane area of the through holes may differ.

At least one of the baffle plate elements may follow the cross-sectional shape of the end orifice it is assigned to (e.g. the respective baffle plate element my be essentially circular if the inner cross-sectional shape of the assigned end-orifice is circular) and the baffle plate element may in particular be larger than the respective assigned end-orifice, e.g. by not more than about 1.0 mm, in particular by not more than about 0.5 mm, and further in particular by not more than about 0.3 mm. At least one of the baffle plate elements may have a depression or concavity in its top surface. A distance between the end orifices and the top surface of the assigned baffle plate element may be in a range of between 0.2 mm and 2.0 mm, in particular in a range of between 0.25 mm and 1.0 mm, and further in particular in the range of between 0.3 mm and 0.7 mm. The respective distance may be different for different pairs of end-orifices and associated baffle plate elements (e.g. description with respect to FIG. 7). The backside of at least one of the baffle plate elements may be convex or may taper towards a peak-like structure for guiding of the air stream around the baffle plate element.

FIG. 1 is a schematic depiction of an example filament transportation device 1 for transporting filaments from an intake area 2 to an outtake area 3. The filament transportation device 1 comprises a plurality of tube elements 10 that receive filament bundles 40 at the intake area 2, where the filament bundles 40 are sucked into the tube elements 10 by means of an air stream 61 generated by at least one of an underpressure or an overpressure. In the shown example embodiment of a filament transportation device 1, filament bundles 40 are separated from a filament reservoir 20 by means of a filament bundle picker 30. A plurality of filament bundles 40 may then be sucked into the tube elements 10 in parallel. The tube elements 10 may be moved towards the filament bundles for the sucking-in step. The tube elements 10 may comprise one or more inflexible portions, in particular at the beginning (i.e. inlet area 2) and at the end (i.e. outlet area 3) of the tube elements and at least one flexible portion, in particular extending between the inflexible portions. The flexible portions of the tube elements 10 may be realized as plastic hoses (e.g. made from a polyamide such as PA 6.12 or from tetrafluoroethylene perfluoromethylvinylether, i.e. MFA) having a wall thickness that is strong enough to withstand the applied underpressure. In the shown embodiment, the flexible tube elements are fixed by a first holder element 12 at the inlet area 2 and by a second holder element 13 in the outlet area 3. The tube elements 10 transport the filament bundles 40 to the outlet area 3, where the tube elements 10 may end as filament collection holes 51 of a filament collection plate 50. The filament collection plate 50 may be arranged to be detachable from the flexible tube element portions.

It is known that the filament bundles 40 may typically not stick together, but that the filament bundles are torn apart by friction with the inner walls of the tube elements and friction between the filaments and that often the filaments arrive at the outlet area 3 in succession of individual filaments or sub-bundles of filaments. Each of the tube elements 10 (i.e. the filament collection holes 51 in the shown example) has one end orifice 11 through which the filaments would be transported away by the air stream 61 if the filaments were not stopped. A baffle plate unit 90 comprising a baffle plate 91 having a top surface 92 for stopping the filaments (on the top surface portions of baffle plate elements) is arranged opposite to the plurality of end orifices 11. The baffle plate 91 shall stop the filaments in a manner so that the air stream 61 flowing around the baffle plate is essentially not able to carry along the filaments. A pressure chamber 60 may be provided around the outtake area 3 and the pressure chamber 60 may comprise an outlet connected with an air pump 62, e.g. a vacuum pump.

Figure 2:
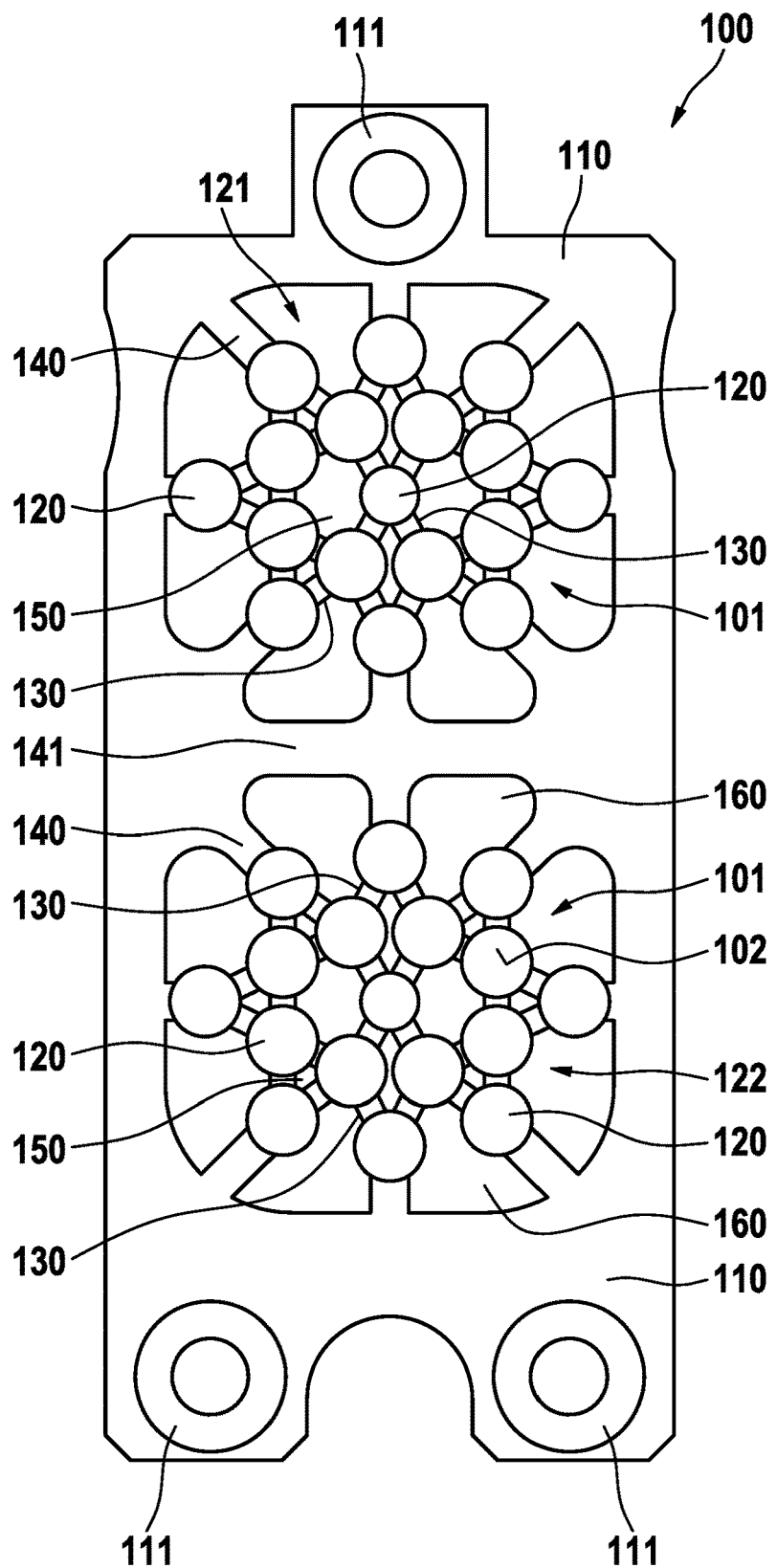
FIG. 2 is a top view onto a first embodiment of an example baffle plate unit.

FIG. 2 is a top view onto an example embodiment of a baffle plate unit 100. The baffle plate unit 100 comprises a baffle plate 101 and a mounting frame 110. The mounting frame 110 may comprise mounting structures 111 for mounting the baffle plate unit 100 to some other structure (such as the pressure chamber 60 shown in FIG. 1). The baffle plate 101 comprises a plurality of baffle plate elements 120 that in the shown embodiment each have a circular shape when viewed from the top (see FIG. 6B for an example cross section through a baffle plate element 120E). The circular baffle plate elements 120 may have different diameter. In general, the baffle plate elements 120 may have any suitable shape and/or size—in the present description they are always shown as circular elements, which shall not be interpreted as limiting. In the shown example embodiment, the baffle plate elements 120 are arranged in two groups of baffle plate elements 121 and 122. Generally, the baffle plate elements 120 may be arranged in a single group or in any number of groups. The baffle plate elements 120 may be connected with each other by means of bridge elements 130 and some baffle plate elements (in particular those disposed at an edge of the groups of baffle plate elements 121 and 122) may be connected with the mounting frame 110 by means of bridge elements 140. In the shown example, also a central bridge element 141 is shown that extends from one side of the mounting frame to the opposite side, where the central bridge element 141 may have at least one arm (two in the shown example) that connect at least one baffle plate element 120 with the mounting frame 110. The bridge elements 130 connecting the baffle plate elements 120 with each other and the bridge elements 140 connecting baffle plate elements 120 with the mounting frame 110 may generally have a width that is smaller than the diameter of the baffle plate elements 120, e.g. smaller by 10% or 20% or 30% or 40% or 50% or 60% or 70% or 80% or 90% etc. The width of the bridge elements shall be measured on the top surface of the bridge element perpendicular to the extension direction, where the extension direction is the direction along which the baffle plate elements are connected. Due to this design, the baffle plate 101 comprises at least one through hole 150 or 160 that extends at least partially between neighboring baffle plate elements 120. In this context, a through hole 150 or 160 extends (at least partially) between two neighboring baffle plate elements 120, if at least one line that starts from an arbitrary point of one baffle plate element 120 and ends at another arbitrary point of a neighboring baffle plate element 120 crosses the through hole 150 or 160 (when viewed from the top). Due to this particular design, the air stream exiting the end orifices of the tube elements (see FIG. 1) can flow almost directly through the through-holes 150, 160 instead of flowing around a closed baffle plate. The area of the at least one trough hole 150 or 160 may also generally be larger than the cross-sectional area of a filament so that any friction between the air and the hole edges is reduced. The area of the at least one through hole 150 or 160 may be at least about 0.0044 $mm^2$, or at least about 0.005 $mm^2$, or at least about 0.01 $mm^2$, or at least about 0.02 $mm^2$, or at least about 0.05 mm², or at least about 0.1 mm², or at least about 0.2 mm², or at least about 0.5 mm², or at least about 1.0 mm² etc. This reduces the power that the pump needs to apply to pump the air out of the pressure chamber (FIG. 1) to generate a sufficiently strong air flow and thus to generate a sufficiently large suction force at the openings of the tube elements in the intake area. The baffle plate unit 100 may be one single integral element made from metal by metal machining methods such as electrical discharge erosion, chemical etching, milling, polishing etc. Instead of made from solid metal, the baffle plate 100 may also be made by metal sintering or ceramic sintering or by an additive manufacturing technique (3D printing techniques). In the example shown in FIG. 2, the through holes 150 are through holes provided in a central area of the baffle plate as was discussed in a previous paragraph and through holes 160 are through holes provided in an out-of-central area of the baffle plate. The out-of-central area through holes 160 can be realized to have a larger area than the central area through holes 150 due to lower design restrictions.

Figure 3:
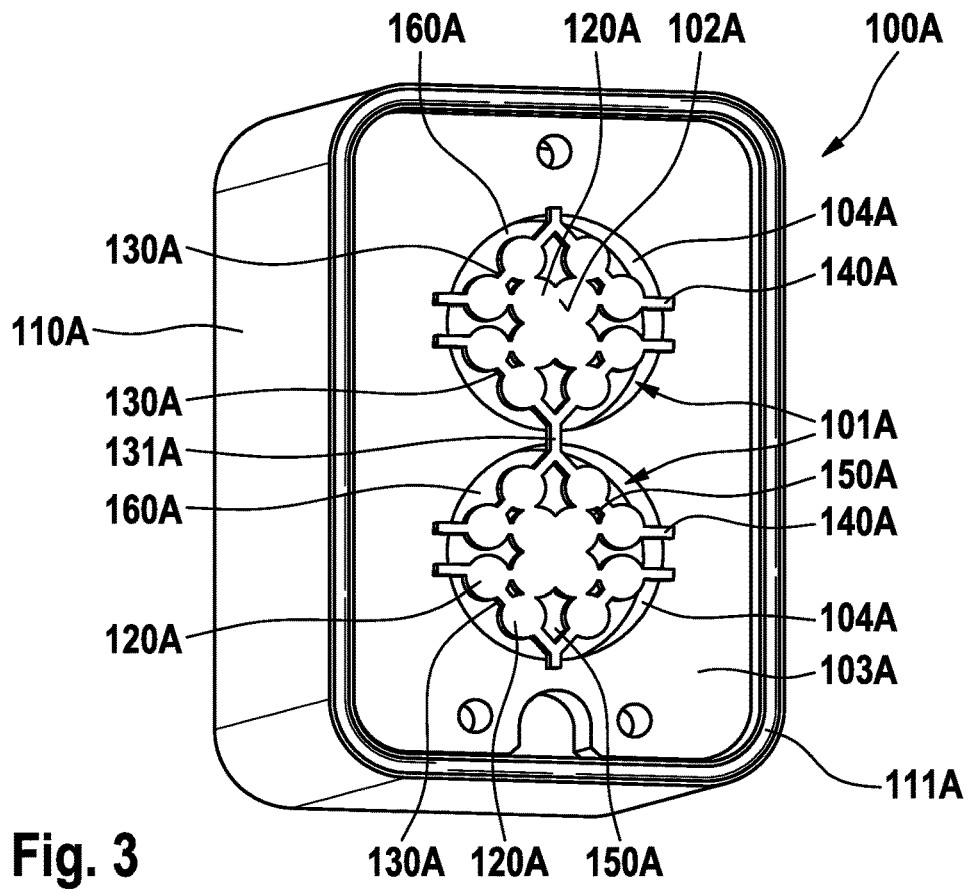
FIG. 3 is a depiction of a second embodiment of an example baffle plate unit.

FIG. 3 shows another example embodiment of a baffle plate unit 100A. In this example, the baffle plate unit 100A is made from essentially three components: a mounting frame 110A, a support 103A having a least one opening 104A, which support 103A is considered as being a part of the mounting frame 110A, and a baffle plate 101A. In the present example, the baffle plate 101A may be made from a metal sheet. In the shown embodiment, the mounting frame 110A may also form at least a portion of a pressure chamber. The mounting frame 110A therefore may comprise a groove 111A for receiving a seal ring for air-tight sealing of the mounting frame at, e.g., a filament collection plate as is shown in FIGS. 4, 5A and 5B.

Again, the baffle plate 101A comprises a plurality of baffle plate elements 120A and bridge elements 130A and 140A for connecting the baffle plate elements 120A with each other or with the support 103A. The baffle plate elements 120A may be arranged in two groups, where in each group four central baffle plate elements may be overlapping and thus no bridge elements need to be used to connect the four central baffle plate elements—the respective central group of baffle plate elements thus forming a merged group of baffle plate elements. Each of the groups of baffle plate elements 120A are arranged here on top of an opening 104A in the support 103A. Through holes 150A and 160A are formed by the baffle plate 101A and the support 103A, which through holes 150A and 160A extend at least partially between baffle plate elements 120A. Through holes 150A are considered as being provided in a central area of the baffle plate 110A, while through holes 160A are considered as being provided in an out-of-central area of the baffle plate 110A.

While not shown in FIG. 3, it can be imagined that a through hole remains in the center of the central group of merged baffle plate elements, which through hole would be considered as provided in a central area of the baffle plate 110 and would fall under the first definition of through holes given in a previous paragraph.

Figure 4:
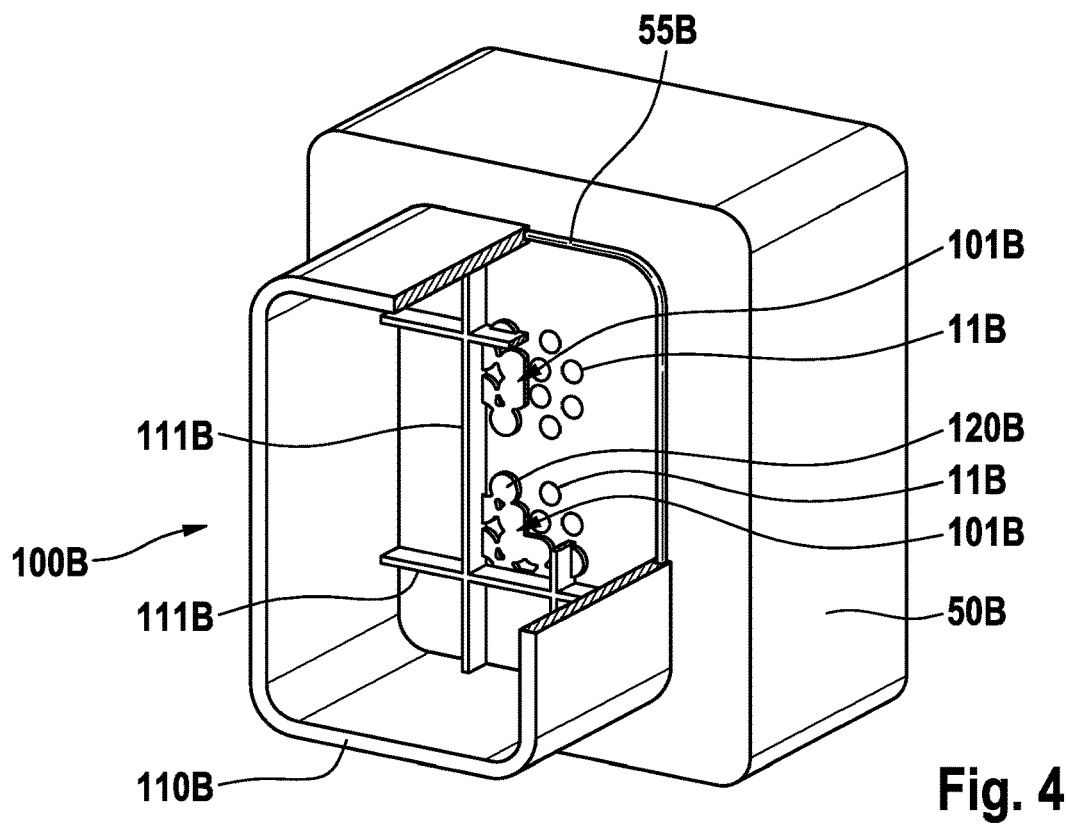
FIG. 4 is a depiction of a third embodiment of an example baffle plate unit and of filament collection plate.
Figure 5A:
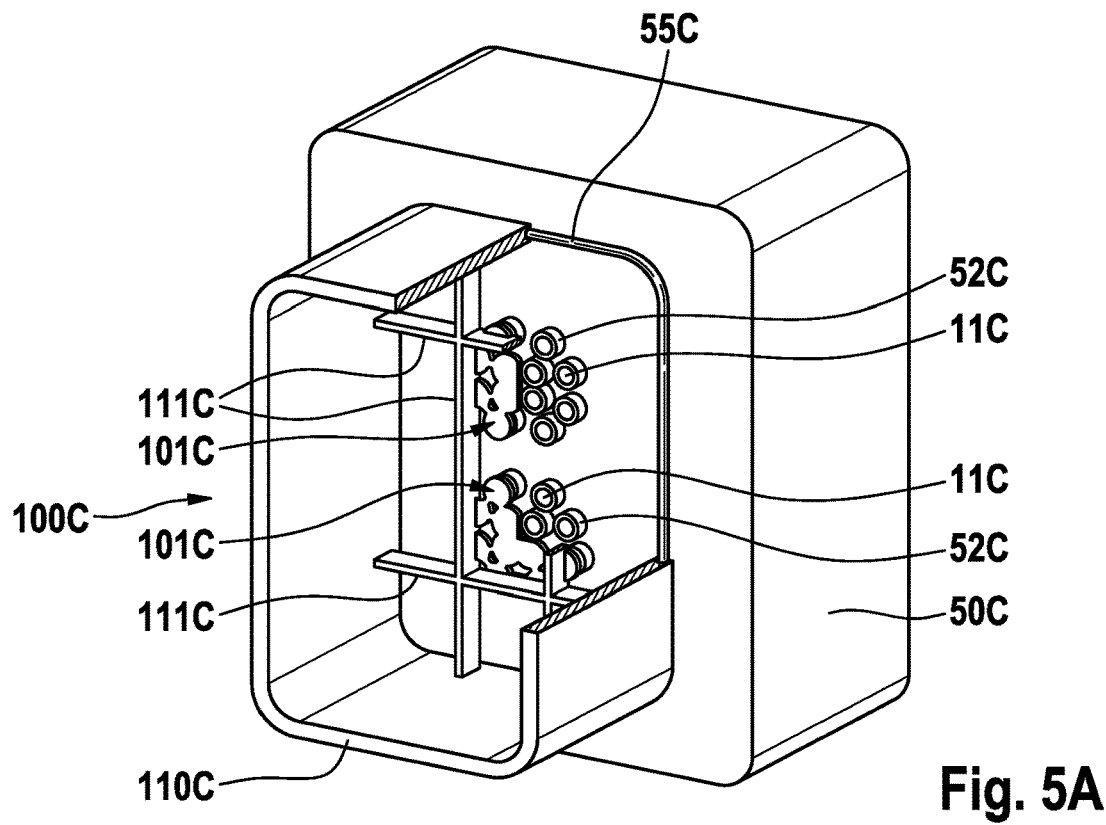
FIG. 5A is a depiction of the baffle plate of the third embodiment together with a different filament collection plate.
Figure 5B:
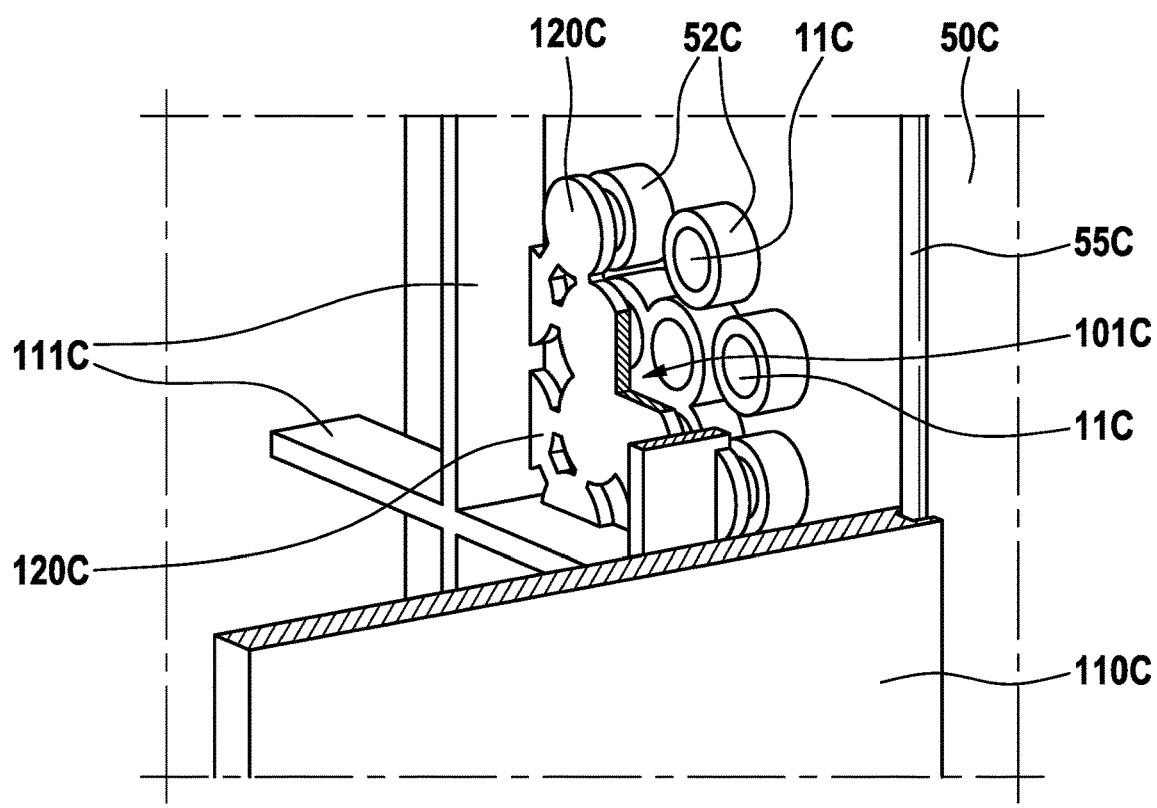
FIG. 5B is a magnification of a portion of FIG. 5A.

FIG. 4 shows a further example embodiment of a baffle plate unit 100B comprising a mounting frame 110B, a baffle plate 101B and support bars 111B. The support bars 11B are considered as being a part of the mounting frame 110B. The baffle plate unit 100B is only partly shown to enable a view onto a bottom side of a filament collection plate 50B having end orifices 11B that are associated with baffle plate elements 120B. The baffle plate 101B may have two groups of connected baffle plate elements or the both groups may be connected by bridge elements. In FIG. 4 it can be seen that a seal ring 55B is provided in a groove of the filament collection plate 50B, which seal ring 55B is received by a groove in the mounting frame 110B so that the mounting frame 110B is connected to filament collection plate 50B in an air-tight manner Such a seal and groove is of course just indicated as optional features.

FIG. 5A shows a baffle plate unit 100C that is very similar to the baffle plate unit 100B shown in FIG. 4 and thus not much will be discussed with respect to this baffle plate unit 100C. The baffle plate unit 100C is again in air-tight connection with a filament collection plate 50C. The major difference of this embodiment is that tube-like protrusions 52C extend from the bottom of the filament collection plate 50C, which tube-like protrusions 52C are extensions of the filament-collection holes and the end orifices 11C of the tube elements are thus located with some distance to the bottom of the filament collection plate 50C. It is believed that the placement of the end orifices 11C with a distance to the bottom of the filament collection plate 50C leads to a better air stream behavior of the air stream exiting the end orifices 11C. FIG. 5B is a magnification of a portion of the baffle plate unit 100C and filament collection plate 50C arrangement shown in FIG. 5A.

Figure 6A:
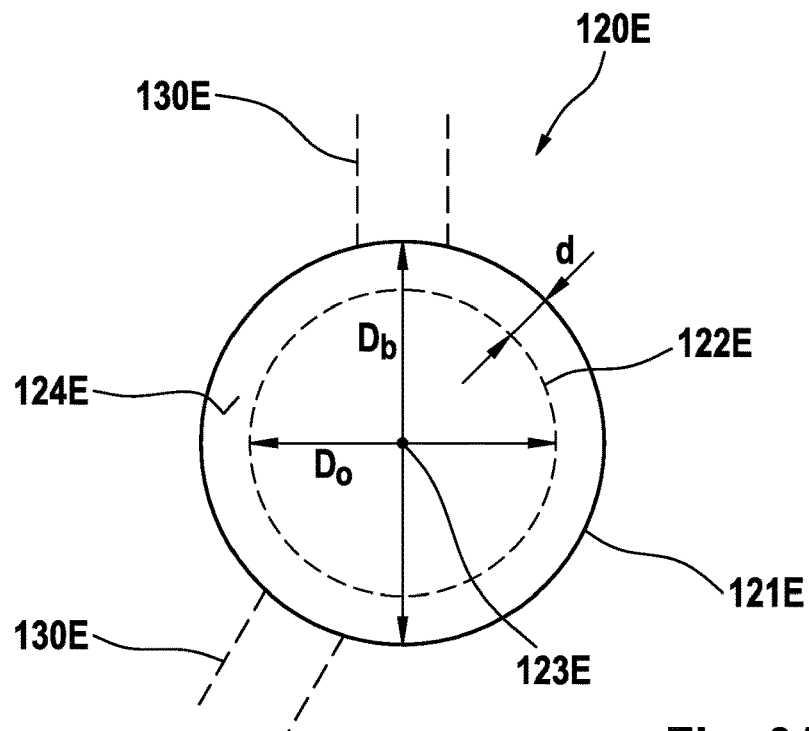
FIG. 6A is a schematic top view onto an example single baffle plate element, where the parallel projection of the associated end orifice is indicated, and the larger size of top surface portion formed by the baffle plate element is indicated as well.
Figure 6B:
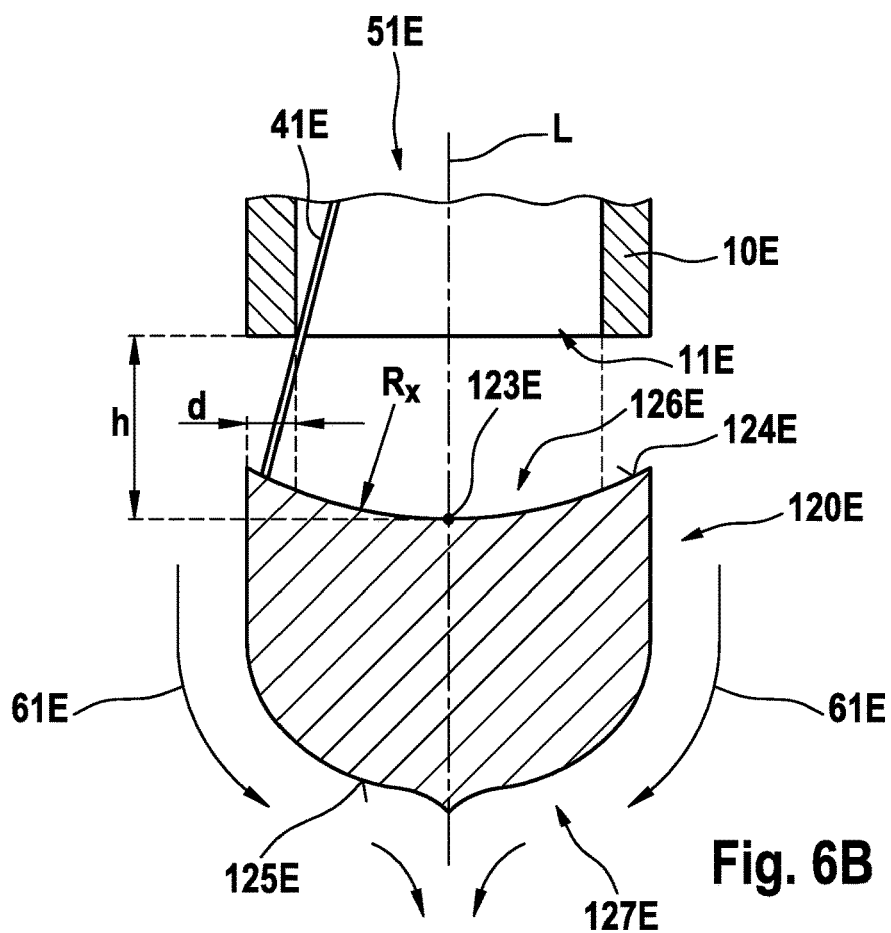
FIG. 6B is a cross section through the baffle plate element shown in FIG. 6A showing example shapes of the top surface and of the bottom surface of this baffle plate element.

FIG. 6A is a schematic top view onto a top surface 124E of a single baffle plate element 120E, which baffle plate element 120E may be connected with at least one other baffle plate element by means of at least one bridge element 130E, where such potential bridge elements 130E are indicated by dashed lines. FIG. 6B is a schematic cross section through the example baffle plate element 120E shown in FIG. 6A and of an associated end orifice 11E of a tube element 10E that in this end region of the tube element 10E is realized by a filament collection hole 51E that has a longitudinal center axis L.

The baffle plate element 120E is here shown to have an essentially circular shape 121E having a diameter $D_b$, which is to be understood as an example only and thus to be interpreted as non-limiting. The baffle plate element 120E may indeed take any shape, which shape may in particular follow the shape of the associated end orifice 11E. It is indicated by line 122E that the parallel projection of the associated end orifice 11E has the same shape as the associated baffle plate element 120E and that the parallel projection 122E of the end orifice completely fits within the top surface 124E of the baffle plate element 120E. In the shown embodiment, the top surface 124E of the baffle plate element 120E is in all directions larger than the parallel projection 123E of the associated end orifice 11E by a distance d. A diameter $D_o$ of the here circular parallel projection 122E of the associated end orifice 11E may be in a range of between 0.5 mm to 10 mm, in particular in a range of between 1.0 mm to 5.0 mm, further particular in a range of between 3.5 mm to 4.5 mm, and the distance d may not be larger than about 1.0 mm, in particular not larger than about 0.6 mm and further in particular not larger than about 0.3 mm. This larger size of the top surface 124E in comparison with the parallel projection of the associated end orifice 11E shall serve to stop also filaments that exit the tube element 10E (or the filament collection hole 51E) at an angle. As the filaments that are transported through the tube elements 11E via the airstream do not necessarily stay together as bundles, individual filaments may arrive first at the end orifice 11E and these filaments may exit the end orifice at an angle. An example filament 41E that extends from the end orifice 11E at an angle is shown in FIG. 6B.

As can be seen in FIG. 6B, the baffle plate element 120E has a top surface 124E that has a shape 126E that here is a concave shape, in particular a spherical concave shape, where the sphere defining the concave shape has a radius R. As can be seen in FIG. 6B as well, a parallel projection of the end orifice 11E means a projection of the circumferential edge of the end orifice 11E along lines being parallel to the longitudinal axis L onto the top surface 124E of the baffle plate element 120E. It is to be understood that the concave shape of the top surface 124E is just meant as an example and the top surface 124E may take any other shape, in particular any other concave shape or the top surface may be flat. The shape of the top surface 124E of the baffle plate element 120E may be chosen so that the outer region, in particular the portion of the top surface 124E that extends beyond the parallel projection 122E of the associated end orifice 11E rises above the rest of the top surface 124E towards the end orifice 11E. Such a raised outer top surface 124E tends to cause filaments that are stopped by this surface portion to slide towards the center portion 122E of the top surface 124E. The distance h between a center point 123E of the top surface 124E of the baffle plate element and the plane in which the end orifice 11E lies may be chosen to be small enough so that filaments can essentially not leave the tube element 10E and to be large enough to accommodate sufficient air flow, where air flow or air stream is indicated by arrows 61E in FIG. 6B. The distance h may lie in a range of between 0.1 mm and 5.0 mm, in particular in between 0.2 mm and 3.0 mm, further in particular in between 0.25 mm and 1.5 mm.

As a general consideration, the distance d may be defined to have a minimum value $d_{min}$ that is given as $$d_{min} = h \cdot D_0 / (l^2 - D_0^2)^{1/2},$$

where l is the length of the filament.

Additionally or alternatively to a shaping of the top surface 124E, a bottom surface 125E may have a shape 127E. In some embodiments, the shape 127E of the bottom surface 125E may be a convex shape or a shape that tapers towards the center or towards a peak structure so that the air flow 61E is guided around the baffle plate element 120E. The top surface 124E and the bottom surface 125E are connected by a side surface 126E of the baffle plate element 120E.

A potential bridge element 130E is also shown in FIG. 6B by means of dashed lines. The bridge element 130E has a top surface 134E, a bottom surface 135E and a side surface 136E. While the bridge element 130E is here shown to have a height in longitudinal direction L that is smaller than the height of the baffle plate element 120E, this is to be understood as only an example and the respective heights could be identical or the height of the bridge element 130E may also be larger than the height of the baffle plate element 120E.

Figure 7:
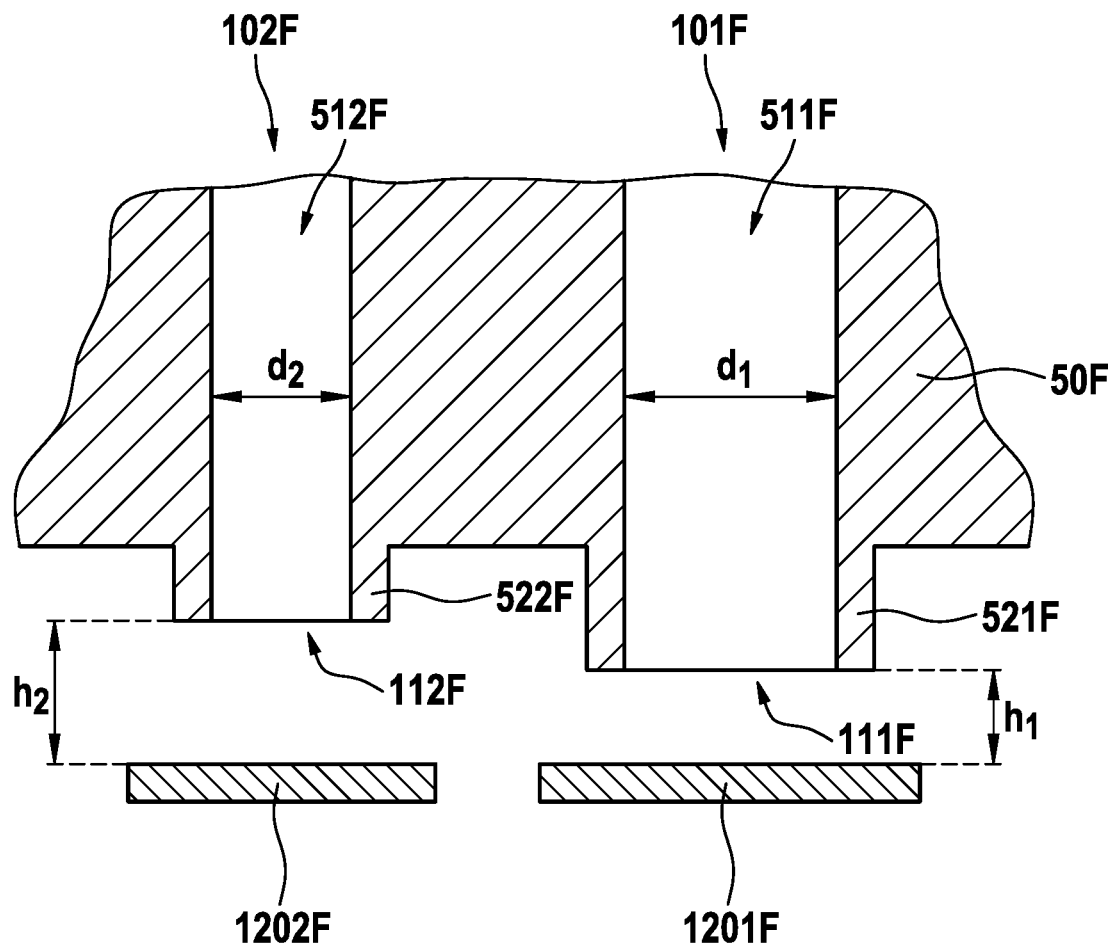
FIG. 7 is a schematic depiction of varying distances between end orifices and baffle plate elements.

FIG. 7 is a cross-sectional depiction of a filament collection plate 50F comprising a first filament collection hole 511F and a second filament collection hole 512F that are realizing the end portions of a first tube element 101F and of a second tube element 102F, respectively. Similarly, as shown in FIGS. 5A and 5B, a first end orifice 111F of the first tube element 101F and a second end orifice 112F of the second tube elements 102F are provided at a first tube-like projection 521F and at a second tube-like projection 522F, respectively, that project from the outer surface of the filament collection plate 50F. A first baffle plate element 1201F is arranged opposite to the first end orifice 111F and is thus associated with the first end orifice 111F and a second baffle plate element 1202F is arranged opposite to the second end orifice 112F and is thus associated with the second end orifice 112F. The shown first and second tube-like projections 521F and 522F extend differently far from the filament collection plate 50F. The first end orifice 111F has an inner diameter $d_1$ and the second end orifice 112F has an inner diameter $d_2$, where $d_1 > d_2$. Due to the different extension lengths from the filament collection plate 50F, the first end orifice 111F and the first baffle plate element 1201F have a first distance $h_1$ and the second end orifice 112F and the second baffle plate element 1202F have a distance $h_2$, where $h_1 > h_2$. This shall exemplify that the distance between an end orifice and the associated baffle plate element can be varied and can be different for each pair of associated end orifice and baffle plate element, and in particular can be varied in accordance with the inner diameter of the end orifices such as by means of an inverse proportionality. This may have a benefit for the air flow restriction effect of the baffle plates as the distance is higher for the end orifice with the smaller diameter. Instead as shown here, where tube-like projections are used to realize the different distances, the baffle plate elements may also be arranged on different levels or both concepts may be simultaneously used.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A filament-transportation device comprising:
   a plurality of tube elements for transporting filaments from an intake area to an outtake area via an airstream generated by at least one of an underpressure and overpressure, each tube element having an end orifice;
   a baffle-plate unit comprising a baffle plate having a top surface arranged opposite to the end orifices of the plurality of tube elements to stop the transport of the filaments and a bottom surface arranged opposite to the top surface;
   wherein the baffle plate comprises a plurality of baffle-plate elements each of which is associated with one of the end orifices and is arranged opposite to the respective associated end orifice such that filaments transported through the respective tube element will be stopped by the associated baffle-plate element, wherein each of the baffle-plate elements has a top surface forming part of the top surface of the baffle plate and a bottom surface forming part of the bottom surface of the baffle plate and a side surface extending between the top surface and the bottom surface of the baffle-plate element;

a plurality of bridge elements, each having a top surface forming part of the top surface of the baffle plate, a bottom surface forming part of the bottom surface of the baffle plate, and a side surface extending from the top surface of the bridge element to the bottom surface of the bridge element, wherein the baffle plate has at least one through-hole that is defined either by the side surfaces of at least two baffle-plate elements or by the side surfaces of at least one baffle-plate element and a side surface of at least one bridge element not facing an end orifice of the tube element, which bridge element connects two spaced apart baffle-plate elements from the plurality of baffle-plate elements.

2. The device of claim 1, wherein the baffle-plate unit comprises a mounting frame and the at least one bridge element connecting the baffle plate and the mounting frame.

3. The device of claim 2, wherein the baffle plate is integral with the mounting frame.

4. The device of claim 2, wherein the baffle plate unit comprises at least one supporting bar that is connected to the mounting frame and the baffle plate.

5. The device of claim 2, wherein a minimum width of the through-hole is selected from the group consisting of a width of above 0.15 mm, a width of above 0.25 mm, and a width of above 0.5 mm.

6. The device of claim 1, wherein at least one of the baffle-plate elements comprises a venting hole having a maximum width at the top surface of the baffle plate that is selected from the group consisting of a width of 0.125 mm, a width of less than 0.1 mm, and a width of less than 0.075 mm.

7. The device of claim 1, wherein at least one of the baffle-plate elements has an outer contour that approximates a contour of the respective associated end orifice and extends beyond a parallel projection of the end orifice by not more than a distance selected from the group consisting of a distance of 1.0 mm, a distance of not more than 0.5 mm, and a distance of not more than 0.3 mm.

8. The device of claim 1, wherein at least two of the baffle-plate elements form a merged group of baffle-plate elements, wherein the side surfaces of the at least two baffle plate elements do not encircle each of the individual baffle-plate elements of the merged group of baffle-plate elements but the side surfaces of the two or more merged baffle-plate elements abut one another at two or more contact edges, and wherein contact edges extend from the top surface to the bottom surface.

9. The device of claim 1, wherein at least one of the baffle-plate elements has a depression in the top surface.

10. The device of claim 1, wherein an inner diameter of a first end orifice is larger than a diameter of a second end orifice and wherein the first end orifice has a distance to an associated first baffle-plate element that is smaller than the distance between the second end orifice and an associated second baffle-plate element.

11. The device of claim 1, wherein a distance between the end orifices and the top surface of the baffle plate is selected from the group consisting of a distance of between 0.2 mm and 2.0 mm, a distance of 0.25 mm and 1.0 mm, and a distance of between 0.3 mm and 0.7 mm.

12. The device of claim 1, wherein at least one of the tube elements comprises a filament-collection hole provided in a filament-collection plate, and the end orifice of this tube element is provided by a tube-like projection that protrudes from an extension plate as an extension of the filament-collection hole.

13. The device of claim 1, wherein a backside of at least one of the baffle-plate elements is convex or tapers towards a center or towards a peak structure.

* * * * *